United States Patent [19]

Ament et al.

[11] Patent Number: 5,390,488
[45] Date of Patent: Feb. 21, 1995

[54] AIR INJECTION CONTROL FOR PREHEATED CATALYSTS

[75] Inventors: Frank Ament, Troy; David A. Singer, Farmington; David B. Brown, Shelby Township, Macomb County, all of Mich.

[73] Assignee: General Motors Corporation, Detroit, Mich.

[21] Appl. No.: 172,779

[22] Filed: Dec. 27, 1993

[51] Int. Cl.⁶ ............................................. F01N 3/20
[52] U.S. Cl. ................................ 60/274; 60/284; 60/289; 60/300
[58] Field of Search ................. 60/274, 284, 300, 289

[56] References Cited

U.S. PATENT DOCUMENTS

| | | | |
|---|---|---|---|
| H 1,113 | 12/1992 | Yoshizaki | 60/284 |
| 3,779,015 | 12/1973 | Maruoka | 60/300 |
| 3,823,555 | 7/1974 | Cole | 60/300 |
| 4,406,120 | 9/1983 | Irish | 60/284 |
| 5,177,961 | 1/1993 | Whittenberger | 60/300 |
| 5,257,501 | 11/1993 | Wataya | 60/284 |

*Primary Examiner*—Ira S. Lazarus
*Assistant Examiner*—Daniel J. O'Connor
*Attorney, Agent, or Firm*—Michael J. Bridges

[57] ABSTRACT

When a preheater elevates internal combustion engine exhaust gas treatment means temperature above a threshold temperature and prior to and during engine cranking, supplemental air is provided to an internal combustion engine exhaust gas path at a controlled rate responsive to parameters indicating excess engine emission levels during an engine startup period.

9 Claims, 2 Drawing Sheets

AIR INJECTION CONTROL FOR PREHEATED CATALYSTS

FIELD OF THE INVENTION

The present invention relates to internal combustion engine emissions control and, more specifically, to air injection control for preheated catalytic converters.

BACKGROUND OF THE INVENTION

Effective reduction of undesirable internal combustion engine emissions, such as hydrocarbon, carbon monoxide, and oxides of nitrogen is provided through catalytic treatment of engine exhaust gas. Efficient catalytic treatment may be provided by passing engine exhaust gas through a catalytic converter which becomes catalytically active when heated, such as through heat energy transfer from engine exhaust gas, to light-off temperature, typically about 400 degrees Celsius. It is known to apply supplemental heating to the converter or to the exhaust gas entering the converter to reduce the time to light-off following an engine coldstart. Advances in supplemental heating efficiency provide that light-off may occur rapidly, for example during initial engine cylinder events, such as engine cranking.

Once a converter reaches light-off and catalytic activity commences, reduction of undesirable exhaust gas constituents such as hydrocarbons HC or carbon monoxide CO through oxidation in the converter may be aided by introducing fresh air in the exhaust gas stream upstream of the converter. A sufficient amount of fresh air must be introduced to provide for complete oxidation, yet the amount must be limited to avoid significant exhaust gas cooling, such as to a temperature below light-off. Accordingly, the amount of air introduced into the exhaust gas stream should be controlled in accord with exhaust gas oxidation requirements, which may be responsive to an estimate of engine air/fuel ratio and exhaust gas flow rate.

To ensure rapid light-off, conventional air control would prevent admission of the relatively low temperature fresh air to the exhaust gas stream during an initial operating period such as during and for a period following an engine coldstart. However, with benefit of advances in supplemental converter heating, proper air control during such an initial period can significantly improve vehicle emissions.

For example, during initial engine cylinder events, such as at the start of engine cranking, it is known to enrich engine air/fuel ratio to provide for more reliable engine startup. The fuel quantity may be further enriched by any fuel hangup quantity present in the engine or the fuel delivery system at startup. This rich startup air/fuel ratio will lead to a period of dramatically increased levels of undesirable exhaust gas constituents, especially HC. Despite a catalytically active converter through the described advances in supplemental converter heating, such increased pollutant levels are not properly oxidized in the converter, as conventional control of fresh air to the exhaust gas stream would preclude a presence of sufficient levels of oxygen in the converter to support such oxidization.

Accordingly, and in recognition of advances in supplemental converter heating, it would be desirable to control admission of fresh air to an internal combustion engine exhaust gas stream so as to provide a sufficient presence of oxygen therein to support oxidation of undesirable exhaust gas constituents during initial engine operating periods.

SUMMARY OF THE INVENTION

The present invention provides the desired benefit in an engine emissions control system including advanced supplemental converter heating by admitting a controlled quantity of fresh air to an engine exhaust gas path upstream of a catalytic converter during an initial engine operating period such as before and during engine cranking.

Specifically, advanced supplemental converter heating provides a rapid rise in converter temperature toward a light-off temperature. As soon as the converter reaches a calibration temperature and prior to engine cranking, supplemental air is admitted to the exhaust gas stream at a controlled rate.

In a further aspect of this invention the controlled rate varies in response to deviations in the engine air/fuel ratio away from the stoichiometric ratio. Elevations in the level of undesirable exhaust gas constituents, such as HC, are estimated by monitoring engine air/fuel ratio. The controlled rate is modulated to provide precisely the amount of oxygen to the exhaust gas path needed to oxidize the elevated constituent levels, while not unnecessarily cooling the converter away from light-off temperature levels.

In yet a further aspect of this invention, engine cranking is not permitted until air is estimated to be passing to the exhaust gas path at a rate that may support oxidation of the described elevated constituent levels during initial engine cylinder events.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
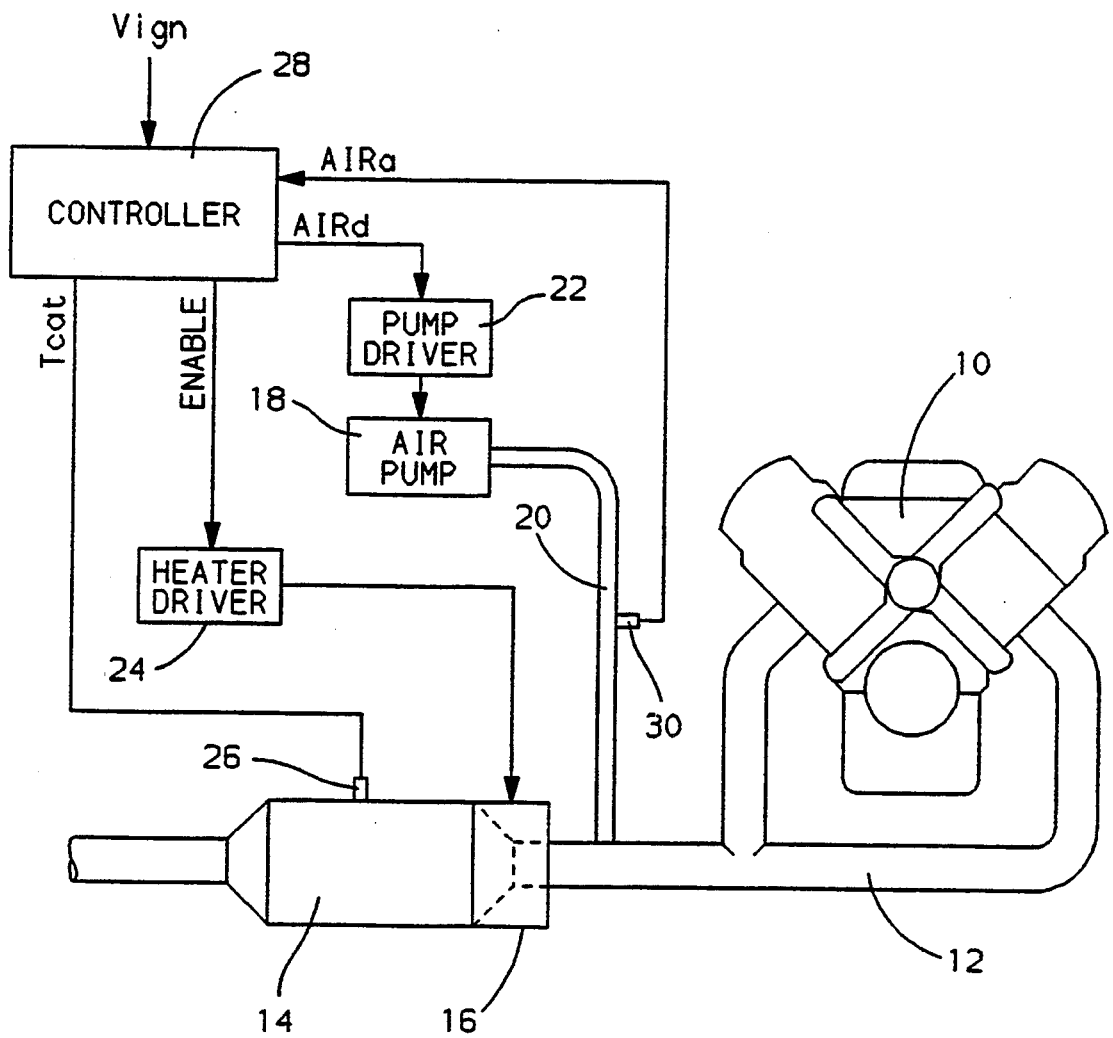
FIG. 1 is a general diagram of the hardware used to carry out the preferred embodiment of this invention.

Referring to FIG. 1, exhaust gas produced through operation of engine 10 is passed through conventional exhaust gas conduit 12 to two stage catalytic converter 14 for catalytic treatment therein. Supplemental catalytic converter heating is provided by heater 16, such as a heater with a conventional electric heating element, for example a Camet EHC converter, or a conventional burner-based heater. The heater is controlled by a drive signal from heater driver 24, the level of which signal is set in accord with well-known catalytic converter heating practice in response to a calibrated desired heating schedule. The heater driver 24 becomes active to control heater 16 operation according to the heating schedule following receipt of an enable signal ENABLE from controller 28.

A conventional thermocouple or thermistor 26 transduces catalytic converter temperature and provides an output signal Tcat indicative thereof. Supplemental air, such as may be drawn from the atmosphere through a conventional air filter (not shown) by action of an air pump 18 is provided to the exhaust gas conduit 12 via air conduit 20 at a point upstream of the converter 14. The air pump 18 is driven by pump driver 22, such as may include conventional drive circuitry for converting a desired air command AIRd issued thereto to an electrical current or voltage level issued to the air pump 18 corresponding to the rate at which the pump is to be driven.

An indication of the rate at which air passes through air conduit 20 through the action of the air pump 18 is provided by sensor 30 which, for example, may be a pressure difference sensor for measuring a pressure drop across a calibrated orifice in air conduit 20. The sensor 30 outputs a signal AIRa indicating actual air rate through conduit 20.

A controller 28, such as a conventional single chip microcontroller, provides supplemental air control and supplemental catalytic converter heating control in accord with this embodiment. Additionally, controller 28 may control general engine operations, such as by controlling fuel, air, and ignition commands to the engine, and by carrying out engine diagnostic and maintenance routines consistent with well-established engine control practices. Such control may be provided through execution of engine control routines stored in controller memory (not shown) which may direct the reading of input signal information and the generation and issuance of actuator commands in response to the input signal information.

For example, a desired air command AIRd may be generated by controller 28 and issued to pump driver 22 for conversion to a drive signal applied to air pump 18. Air may then be pumped into air conduit 20 in accord with the desired air command AIRd. Furthermore, output signal ENABLE may be set so as to initiate supplemental converter heating at appropriate times during engine operation, such as when a vehicle operator applies ignition power Vign to an otherwise idle controller 28. After a desired period of supplemental converter heating, such as when it is estimated that the converter may remain at light-off through heat energy provided thereto from engine exhaust gas, ENABLE may return low, disabling supplemental converter heating operations.

Figure 2:
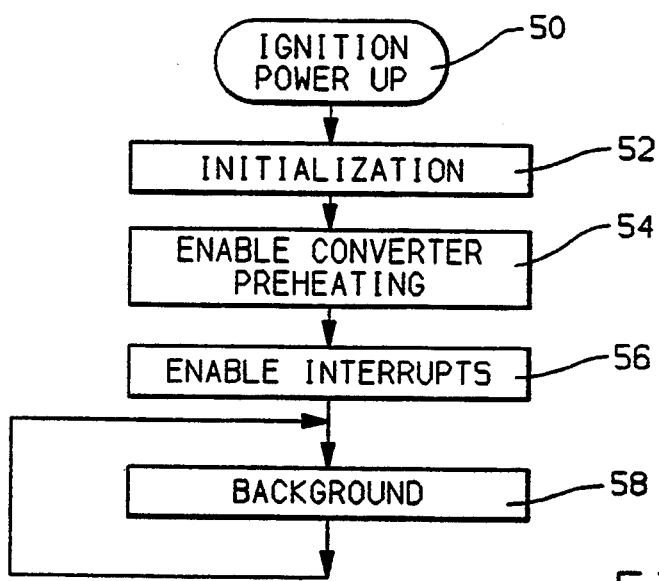
FIGS. 2-3 are computer flow diagrams illustrating the steps used to carry out this invention in accord with the preferred embodiment and with the hardware of FIG. 1.
Figure 3:
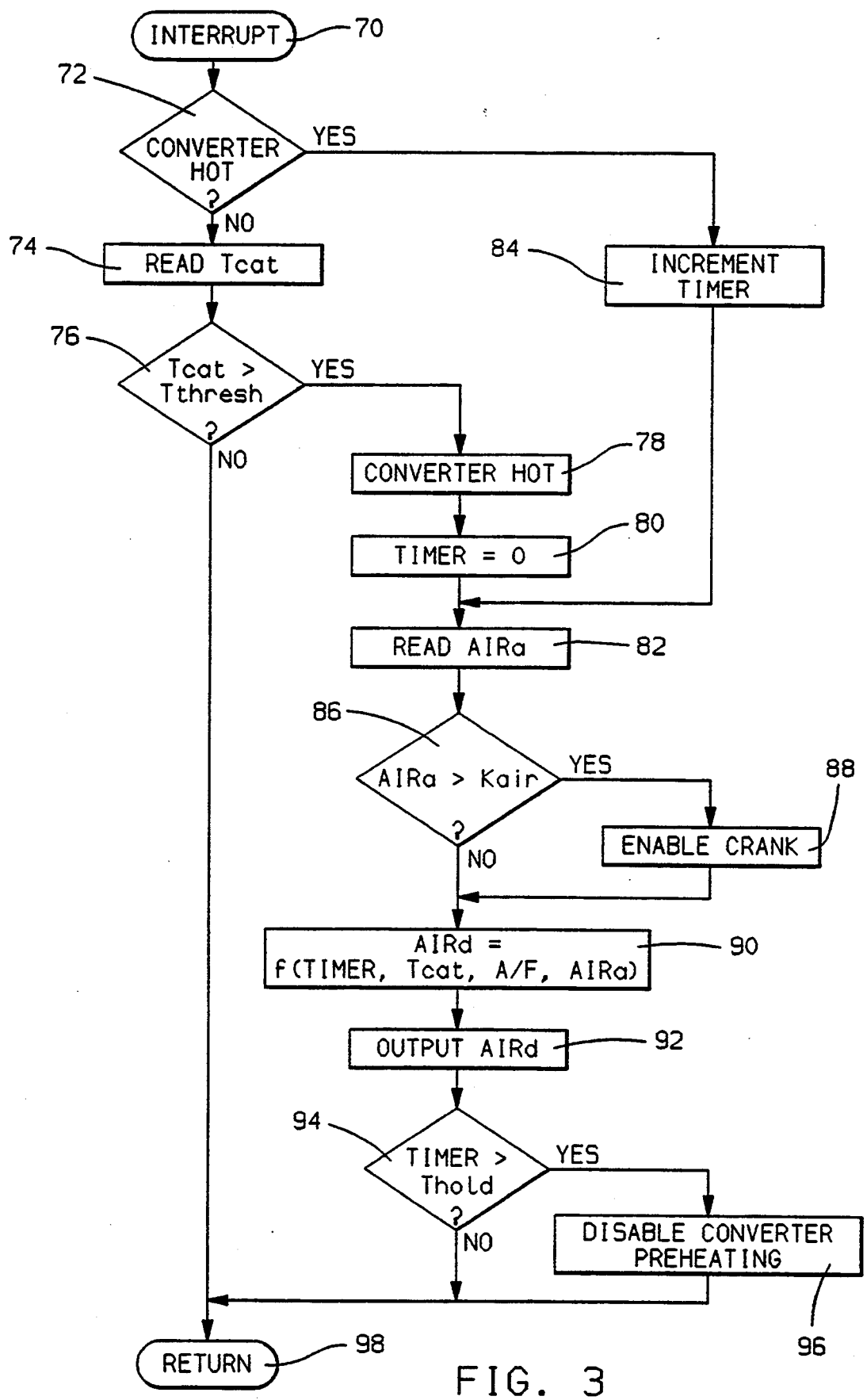

The routines to carry out supplemental converter heating and to supply supplemental air to converter 14 in accord with this embodiment are illustrated in FIGS. 2–3. Other routines may also be included in controller memory for execution while the controller is active, such as conventional engine control, diagnostic, and maintenance routines. Upon application of ignition power Vign to controller 28, such as when a vehicle operator rotates an ignition key to its on position and yet before engine cranking occurs, the routine of FIG. 2 is executed starting at a step 50, and moving to a step 52 at which controller initialization operations take place which may include setting data variables, pointers, flags, and counters to initial values. The routine then enables converter preheating at a step 54, such as by setting output signal ENABLE to a level commanding heater driver 24 (PIG. 1) to begin driving heater 16 according to a calibrated heating schedule, as described.

The routine then proceeds to a step 56 at which conventional controller interrupts, such as both event-based and timer-based interrupts are enabled to occur during controller operation. As is generally understood in conventional microcontroller-based engine control, upon occurrence of the enabled interrupts, control is vectored away from currently active controller operations to dedicated interrupt service routines which carry out service functions, such as engine control or diagnostic functions. Control is returned to the previously active controller operations upon completion of the activated interrupt service routine.

After enabling controller interrupts at the step 56, background operations, represented by a step 58 are continuously repeated while the controller 28 (FIG. 1) is active. Such background operations may include engine or exhaust system diagnostic and maintenance functions, and may be interrupted on the occurrence of any of the enabled interrupts.

One such enabled interrupt in this embodiment is a timer-based interrupt set up to occur at a substantially fixed frequency while enabled. For example, an interrupt may occur once every 50 to 100 milliseconds. This interrupt is serviced by vectoring to an interrupt service routine having a flow of operations corresponding to the steps of the routine of FIG. 3. Generally, this service routine coordinates catalytic converter preheating, control of the rate at which air is pumped to the exhaust gas conduit 12 (FIG. 1), and engine cranking to improve engine emissions, especially at and shortly after engine startup.

As described, supplemental converter preheating occurs immediately when ignition power is applied to controller 28 (FIG. 1). The routine of FIG. 3 provides for closely controlled admission of supplemental air to exhaust gas conduit 12 (FIG. 1) as soon as converter temperature is elevated to a calibrated threshold temperature and before engine cranking is permitted.

The calibrated threshold temperature may correspond to converter light-off temperature, such as approximately 400 degrees Celsius, or may be set to a temperature below that corresponding to light-off, to ensure a presence of a quantity of supplemental air in the converter sufficient to support oxidation of HC and CO as soon as light-off is reached. However, the calibrated threshold temperature should not be set so low that the relatively cool supplemental air is provided to the converter well before the heater has elevated converter temperature close to light-off, as the time to light-off may thereby be significantly increased. Furthermore, once the converter temperature reaches the threshold temperature, the supplemental air rate should be limited to no more than the rate estimated to be necessary to oxidize the engine exhaust gas constituents, such as HC and CO, to avoid unnecessary converter cooling.

Specifically, the routine of FIG. 3 is entered upon a timer-based controller interrupt at a step 70. The routine proceeds to a step 72 to determine if the catalytic converter 14 (FIG. 1) has been previously diagnosed as "hot," such as above a calibrated threshold temperature $T_{thresh}$, set at 350 degrees Celsius in this embodiment. If the converter is hot, such as may be indicated by a flag being set in controller memory, the routine moves to a step 84, to increment TIMER, a count of the number of iterations of this routine that have occurred since the converter was diagnosed as hot. The routine then moves to steps 82–96, to carry out supplemental air control and supplemental converter heating, as will be described.

Returning to the step 72, if the converter is not diagnosed as hot, the routine moves to a step 74, to read Tcat, the converter temperature signal from temperature sensor 26 (FIG. 1). Next, if Tcat exceeds Tthresh at step 76, the routine moves to a step 78 to indicate diagnosis of a hot converter, such as by setting a flag in controller memory, as described. The routine then moves to a step 80, to reset TIMER to zero, to start a count of the number of iterations of the present routine after diagnosis of the hot converter, for use in supplemental air control and supplemental converter heating, as will be described.

After resetting TIMER, the routine moves to a step 82, to read AIRa, the actual rate at which air is passing from air pump 18 through air conduit 20 to exhaust gas conduit 12 (FIG. 1). Next the routine advances to a step 86, to determine if AIRa exceeds Kair, a calibrated air rate threshold value which may be fixed, such as to three grams of air per second in one embodiment, or may vary in another embodiment. For example, Kair may be set as follows $$Kair = AIRd - \delta$$

in which AIRd is a desired air rate, which may vary as a predetermined function of such parameters as engine air/fuel ratio, Tcat, AIRa, and the present TIMER value, as will be described. The value $\delta$ may be set to a small value to allow the condition of step 86 to be met despite minor disturbances in the signal AIRa.

Returning to the step 86, if AIRa exceeds Kair, the routine moves to a step 88, to enable engine cranking, as a sufficient amount of air is sensed to be passing to engine exhaust gas conduit 12 to support conversion of engine exhaust gas constituents generated during and shortly after engine cranking, in accord with the principles of this invention. Engine cranking may be enabled at step 88 by closing a cutoff relay in an engine starter circuit (not shown) to allow starter motor operation. In this embodiment, such a relay would be normally open, such as until closed at the step 88. After enabling crank at step 88, the routine moves to a step 90, to be described.

Returning to the step 86, if AIRa does not exceed Kair, crank is not enabled, to prevent occurrence of exhaust gas producing engine cylinder events until actual air rate AIRa has built up sufficiently through air pump operation to support substantial oxidation of certain constituents of such exhaust gas. Specifically, the step 88 is avoided when AIRa does not exceed Kair by moving directly to a step 90, at which a desired air rate AIRd is determined as the rate at which fresh air should be admitted to the exhaust gas conduit 12 (FIG. 1) to support oxidation under the engine operating conditions, such as under an engine air/fuel ratio A/F, which may be the engine air/fuel ratio under typical startup conditions. As described, the startup conditions may include a commanded rich engine air/fuel ratio for improved engine startup reliability. The actual air/fuel ratio, at least during a first few engine cycles, may be further enriched beyond that caused by the rich air/fuel ratio command due to any fuel hangup quantity in the fuel delivery system which may serve to augment commanded fuel to the engine 10 (FIG. 1).

An air rate sufficient to oxidize levels of HC and CO corresponding to such a startup engine air/fuel ratio is provided through the functional relationship illustrated at step 90, in which AIRd is set in response to engine air/fuel ratio A/F. AIRd may also be determined in response to Tcat, wherein additional air may be pumped if Tcat is high enough that such additional air will not affect converter efficiency, such as by decreasing Tcat below light-off. AIRd may also be determined in response to AIRa, such as in accord with general classical or modern closed-loop control techniques. Still further, AIRd may be determined in response to TIMER, by which AIRd is reduced toward zero a predetermined time period after the converter heats up, consistent with known converter heating control practices. Exhaust gas flow rate may also be used in the determination of AIRd, for example to apply in a feedforward compensation of exhaust gas backpressure effects on fresh air flow rate, or to apply with engine air/fuel ratio in a determination of the rate at which an amount of HC and CO are passing to the catalytic converter 14 (FIG. 1). Exhaust gas flow rate may, for example, be estimated using an engine intake airflow sensor or using a combination of such sensed parameters as engine speed, engine intake manifold pressure, and ambient pressure.

After determining AIRd at step 90, the routine moves to a step 92, to output AIRd from controller 28 (FIG. 1) to pump driver 22, which will issue a drive command to air pump 18 in response to AIRd, as described. The routine then moves to a step 94, to compare TIMER to a calibrated hold time Thold, set to correspond to a desired supplemental converter heating time. Once the converter reaches some predetermined threshold temperature, such as Tthresh, supplemental converter heating may only be necessary until the heat content of the engine exhaust gas alone can maintain the converter at light-off.

In this embodiment, supplemental converter heating is assumed to be unnecessary when Tcat exceeds Tthresh for at least Thold iterations of the routine of FIG. 3. Accordingly, at step 94, if TIMER exceeds Thold, the routine moves to a step 96 to disable converter heating, such as by setting signal ENABLE (FIG. 1) to a level that will disable heater driver 24. Next, or if TIMER was less than Thold at step 94, the routine moves to a step 98 to return to controller operations that were suspended by the occurrence of the interrupt corresponding to the routine of FIG. 3.

Returning to the step 76, if Tcat is not greater than Tthresh, the catalytic converter 14 (FIG. 1) is assumed to not be at or sufficiently close to light-off to benefit from initiation of the supplemental air control of the present embodiment. The relatively cool fresh air would tend to increase the time to light-off while not yet providing a significant emissions reduction benefit as the converter is not yet catalytically active. Accordingly, the supplemental air control is avoided by moving directly to the described step 98, at which the present interrupt service routine terminates.

The description of the preferred embodiment for the purpose of explaining the invention is not to be taken as limiting or restricting the invention since many modifications may be made through the exercise of skill in the art without departing from the scope of the invention.

The embodiments of the invention in which a property or privilege is claimed are described as follows:

1. A method for admitting a quantity of supplemental air to an exhaust gas path of an internal combustion engine having a supplementally heated exhaust gas treatment means for catalytically treating engine exhaust gas, comprising the steps of:

detecting a vehicle startup command;

activating supplemental heating of the exhaust gas treatment means upon detecting the vehicle startup command;

sensing temperature of the exhaust gas treatment means;

comparing exhaust gas treatment means temperature to a predetermined temperature;

initiating admission of supplemental air to the exhaust gas path at a commanded rate when the exhaust gas treatment means temperature exceeds the predetermined temperature; and enabling engine starting after initiating admission of supplemental air to the exhaust gas path.

2. The method of claim 1, further comprising the steps of:

predicting engine air/fuel ratio during an engine startup period;

predicting exhaust gas flow rate during the engine startup period; and determining the commanded rate as a predetermined function of the predicted engine air/fuel ratio and the predicted exhaust gas flow rate.

3. The method of claim 2, wherein the engine startup period includes engine cylinder events that occur during engine cranking.

4. The method of claim 2, wherein the engine startup period includes an initial engine operating period characterized by a rich commanded engine air/fuel ratio.

5. The method of claim 1, further comprising the steps of:

estimating actual supplemental air flow rate to the engine exhaust gas path;

comparing the estimated actual supplemental air flow rate to a predetermined threshold rate;

and wherein the step of enabling engine starting enables engine starting when the estimated rate exceeds the predetermined threshold rate.

6. The method of claim 5, wherein the predetermined threshold rate is a predetermined fraction of the commanded rate.

7. A method for controlling, prior to and during an engine startup period including an engine cranking period, a quantity of supplemental air admitted to an internal combustion engine exhaust gas path having an electrical heating element for supplemental heating of an exhaust gas treatment means, comprising the steps of:

detecting a signal indicating a start of a heating cycle;

energizing the electrical heating element to provide for supplemental heating of the exhaust gas treatment means upon detecting the signal;

sensing temperature of the exhaust gas treatment means;

comparing exhaust gas treatment means temperature to a predetermined temperature;

metering supplemental air to the exhaust gas path according to a predetermined metering schedule when exhaust gas treatment means temperature exceeds the predetermined temperature;

sensing a rate at which the metered supplemental air passes to the exhaust gas path;

comparing the sensed rate to a predetermined rate; and precluding occurrence of engine cylinder events until the sensed rate exceeds the predetermined rate.

8. The method of claim 7, further comprising the steps of:

estimating engine air/fuel ratio during the engine startup period;

estimating exhaust gas flow rate during the engine startup period; and adjusting the predetermined metering schedule as a predetermined function of the estimated engine air/fuel ratio and the estimated exhaust gas flow rate.

9. The method of claim 7, wherein the engine startup period includes an initial engine operating period characterized by a rich commanded engine air/fuel ratio.

* * * * *